(12) United States Patent  (10) Patent No.: US 8,277,703 B2
Walker et al.  (45) Date of Patent: Oct. 2, 2012

(54) SMOKE SUPPRESSANTS

(75) Inventors: Joseph K. Walker, Mentor, OH (US); Elmer D. Luke, Jr., Girard, OH (US)

(73) Assignee: J. M. Huber Corporation, Atlanta, GA (US)

( * ) Notice: Subject to any disclaimer, the term of this patent is extended or adjusted under 35 U.S.C. 154(b) by 0 days.

(21) Appl. No.: 13/087,432

(22) Filed: Apr. 15, 2011

(65) Prior Publication Data

US 2011/0263773 A1   Oct. 27, 2011

Related U.S. Application Data

(60) Provisional application No. 61/327,272, filed on Apr. 23, 2010.

(51) Int. Cl.
*C09K 21/02* (2006.01)
*C08K 3/10* (2006.01)
*C08K 3/38* (2006.01)

(52) U.S. Cl. ........ 252/602; 252/609; 524/405; 524/406; 524/432

(58) Field of Classification Search .................. 252/602, 252/609, 182.33; 524/405, 406, 432
See application file for complete search history.

(56) References Cited

U.S. PATENT DOCUMENTS

| | | | | |
|---|---|---|---|---|
| 3,900,441 A * | 8/1975 | King | | 524/406 |
| 4,328,152 A * | 5/1982 | Tsigdinos et al. | | 524/406 |
| 5,227,417 A * | 7/1993 | Kroushl, III | | 524/114 |
| 5,886,072 A * | 3/1999 | Linsky et al. | | 524/145 |
| 6,528,558 B2 * | 3/2003 | Lewin | | 524/100 |
| 6,943,207 B2 * | 9/2005 | Chanak et al. | | 524/277 |
| 8,070,990 B2 * | 12/2011 | Ho et al. | | 252/609 |
| 2004/0054058 A1 * | 3/2004 | Baldorf | | 524/432 |
| 2005/0142371 A1 * | 6/2005 | Swain et al. | | 428/516 |
| 2006/0240242 A1 * | 10/2006 | Raghavendran et al. | | 428/304.4 |
| 2006/0254458 A1 * | 11/2006 | Ghiang et al. | | 106/18.21 |
| 2009/0069480 A1 * | 3/2009 | Zangara et al. | | 524/405 |
| 2009/0215943 A1 * | 8/2009 | Hirose et al. | | 524/405 |
| 2009/0238957 A1 * | 9/2009 | Clancy | | 427/117 |

OTHER PUBLICATIONS

Ferm. D.J. et al., "The Effect of Zinc Borate in Combination With Ammonium Octamolybdate or Zinc Stannate on Smoke Suppression in Flexible PVC," Journal of Vinyl & Additive Technology, 1997, 3(1): 33-41.

Moore, F.W. et al., "Effect of Co-Additives on the Flame/Smoke Suppression Properties of Zinc Borates," Journal of Vinyl Technology, 1991, 13(3): 169-173.

International Search Report and Wriiten Opinion issued on Aug. 17, 2011 for Intl. App. No. PCT/US2011/033167, filed Apr. 20, 2011 (Inventor—Walker et al.; Applicant—J.M. Huber Corp.)

Non-Final Office Action issued on Jul. 31, 2009, for U.S. Appl. No. 11/934,427, now Patent No. 8,070,990, filed Nov. 2, 2007, issued on Dec. 6, 2011 (Applicant—J.M. Huber Corporation).

Response to Non-Final Office Action filed on Oct. 30, 2009, for U.S. Appl. No. 11/934,427, now Patent No. 8,070,990, filed Nov. 2, 2007, issued on Dec. 6, 2011 (Applicant—J.M. Huber Corporation).

(Continued)

*Primary Examiner* — Joseph D Anthony
(74) *Attorney, Agent, or Firm* — Ballard Spahr LLP

(57) ABSTRACT

The smoke suppressant comprises a molybdate precipitate on the surface of a borate core. The precipitate increases surface area of the core and provides improved smoke suppression relative to a mixture of the molybdate and borate core. The suppressants can be incorporated into polymer compositions to improve their smoke suppression capability.

8 Claims, 2 Drawing Sheets

OTHER PUBLICATIONS

Final Office Action issued on Jan. 19, 2010, for U.S. Appl. No. 11/934,427, now Patent No. 8,070,990, filed Nov. 2, 2007, issued on Dec. 6, 2011 (Applicant—J.M. Huber Corporation).

Request for Continued Examination and Response to Final Office Action filed on Jun. 23, 2010, for U.S. Appl. No. 11/934,427, now Patent No. 8,070,990, filed Nov. 2, 2007, issued on Dec. 6, 2011 (Applicant—J.M. Huber Corporation).

Notice of Allowance issued on Sep. 2, 2011, for U.S. Appl. No. 11/934,427, now Patent No. 8,070,990, filed Nov. 2, 2007, issued on Dec. 6, 2011 (Applicant—J.M. Huber Corporation).

Issue Fee Payment filed on Sep. 16, 2011, for U.S. Appl. No. 11/934,427, now Patent No. 8,070,990, filed Nov. 2, 2007, issued on Dec. 6, 2011 (Applicant—J.M. Huber Corporation).

Amendment After Notice of Allowance filed on Nov. 1, 2011, for U.S. Appl. No. 11/934,427, now Patent No. 8,070,990, filed Nov. 2, 2007, issued on Dec. 6, 2011 (Applicant—J.M. Huber Corporation).

Response to Amendment After Notice of Allowance issued on Nov. 8, 2011, for U.S. Appl. No. 11/934,427, now Patent No. 8,070,990, filed Nov. 2, 2007, issued on Dec. 6, 2011 (Applicant—J.M. Huber Corporation).

Issue Notification issued on Nov. 16, 2011, for U.S. Appl. No. 11/934,427, now Patent No. 8,070,990, filed Nov. 2, 2007, issued on Dec. 6, 2011 (Applicant—J.M. Huber Corporation).

* cited by examiner

SMOKE SUPPRESSANTS

CROSS-REFERENCE TO RELATED APPLICATIONS

This application claims priority to U.S. Provisional Application No. 61/327,272, filed Apr. 23, 2010, the entire contents of which are incorporated into this application by reference.

BACKGROUND

Halogenated polymers are frequently used in the construction of almost all types of buildings, homes, and offices. One reason for using halogenated polymers, rather than other polymers, is that halogenated polymers are comparatively less flammable. Although these polymers are less flammable, they tend to produce a lot of smoke during combustion, particularly when they contain plasticizers. Consequently, governments and municipalities have set limits on smoke development during polymer combustion that can be difficult to meet with ordinary chlorinated polymers.

Thus, a need exists for improved smoke suppressants. This need and other needs are addressed by the present invention.

SUMMARY

The disclosed smoke suppressants are useful in thermoplastic polymer compositions and in other polymer compositions. The smoke suppressants comprise from about 75% to about 95% by weight of a borate core material; and from about 5% to about 25% by weight of zinc molybdate. The smoke suppressants can also be defined as the reaction product of a borate core material, a zinc compound, and a molybdate compound. Additionally, the smoke suppressants can comprise a borate core and zinc molybdate, which is precipitated on the borate core.

The smoke suppressants can be prepared by reacting an aqueous slurry comprising a borate core material and zinc oxide with an aqueous molybdenum trioxide mixture to produce a product slurry, filtering the product slurry, and drying the product slurry to produce a dried mass.

Thermoplastic polymer compositions can comprise the smoke suppressants along with a chlorine-containing polymer, for example. Smoke suppressant characteristics of a variety of polymer compositions can be improved by compounding a disclosed smoke suppressant with a polymer composition.

The advantages of the invention will be discussed below and may be obvious from the description, or may be learned by practicing the invention. The previous general description and the following detailed description are not restrictive.

DETAILED DESCRIPTION

Figure 1:
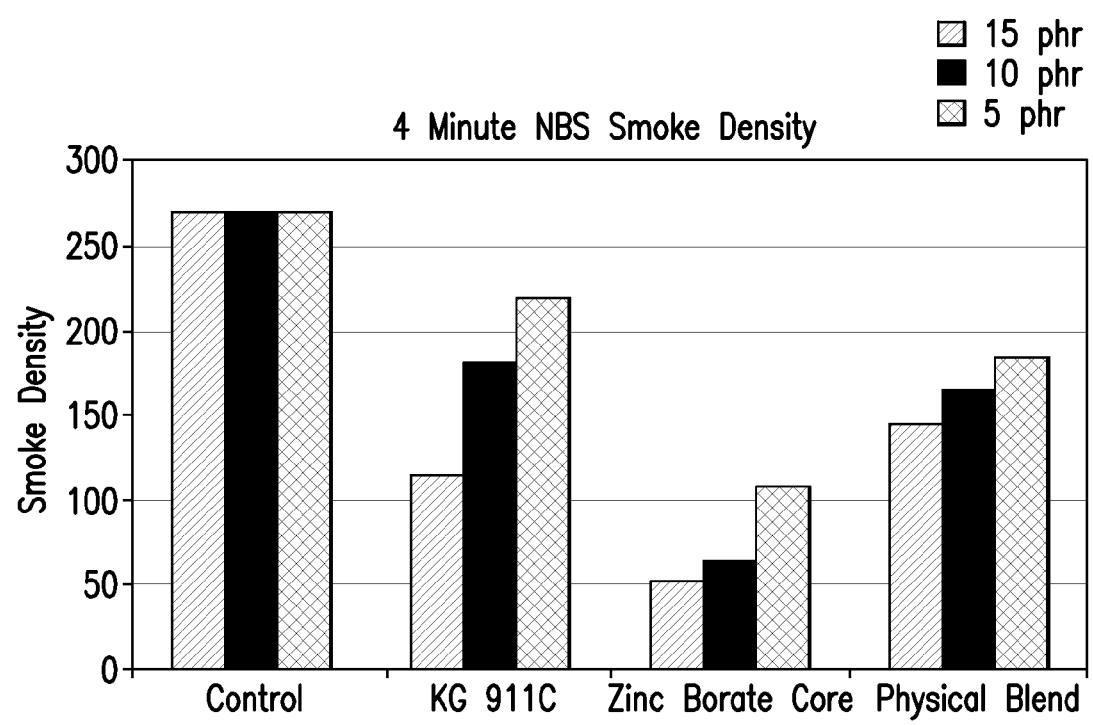
FIG. 1 is a bar plot obtained from a four minute NBS smoke density for Control (no smoke suppressant), KG911C (commercial smoke suppressant), zinc borate core smoke suppressant of the present invention, and a physical blend of zinc borate and zinc molybdate.

The word "comprise," or variations such as "comprises" or "comprising," as used in this application, imply the inclusion of a stated integer or step or group of integers or steps but not the exclusion of any other integer or step or group of integers or steps.

"A," "an" and "the" include plural referents unless the context clearly dictates otherwise.

"Optional" or "optionally" means that the subsequently described event or circumstance can or cannot occur, and that the description includes instances where the event or circumstance occurs and instances where it does not.

Inorganic molybdates are the industry standard for smoke suppression because of their ability to promote char formation. By having zinc molybdate precipitated on the surface of a core material, such as zinc borate or calcium borate, smoke suppression capability increases. It is believed from observing the present invention, though not certain, that increasing the surface area of smoke suppressant particles by precipitating a molybdate on the core material results in smoke suppression improvements.

The smoke suppressants can be prepared by precipitating zinc molybdate onto a smoke-suppressing borate core, such as zinc borate or calcium borate. The zinc molybdate on the surface of the borate core significantly increases smoke suppression performance. Smoke suppression performance of the inventive suppressants is even improved relative to a physical mixture of zinc molybdate and a borate core.

Precipitation of zinc molybdate can be accomplished through a reaction between zinc oxide and a molybdenum source, such as molybdenum trioxide, ammonium dimolybdate, or ammonium octomolybdate, in the presence of a core material, capable of acting as a smoke suppressant, such as zinc borate or calcium borate.

For example, surface treatment of the core can include the following steps: a) preparing a slurry of core material and zinc oxide in water; b) heating the slurry to between about 75 and 80° C.; c) adding molybdenum trioxide ($MoO_3$) in a stoichiometric ratio of 2:3 (2 molar parts molybdenum trioxide, 3 molar parts zinc oxide) to form $Zn_3Mo_2O_9$; d) stirring the slurry for about 2 hours; and e) filtering, drying, and optionally grinding the resulting product.

Zinc borate or calcium borate are preferred core materials. The core materials can have a particle size of about 1 to about 45 microns.

The dried product can be milled using a lave grinder or another useful device. Generally, the zinc molybdate content in the smoke suppressant can be in the range of about 5% to about 25% by weight, and the core material can be in the range of about 75% to about 95% by weight, based on the total weight of the smoke suppressant.

As briefly mentioned above, it is believed that the borate core smoke suppressant has a greater total surface area than any of the individual components or mixtures of any of the individual components. When the core material is zinc borate, for example, the smoke suppressant performs better in an NBS Smoke test than a physical mixture of zinc borate and zinc molybdate.

The smoke suppressants can be incorporated into thermoplastic polymer or other polymer compositions to enhance smoke suppressing capacity of these compositions. These compositions generally comprise a polymer, preferably a chlorine or other halogen-containing polymer, together with a disclosed smoke suppressant. Smoke suppression capacity of polymers can be improved by compounding the polymer with the smoke suppressant.

An example of a suitable polymer for this application is polyvinyl chloride, such as a flexible polyvinylchloride (PVC). Although polyvinylchloride is inherently flame retardant, the use of plasticizers to achieve PVC flexibility has resulted in increased flammability of the material. Thus, PVC is an ideal candidate for use with the smoke suppressants.

The polymer compositions, such as the PVC compositions, can comprise a plasticizer, a flame retardant, or a thermal stabilizer. Useful plasticizers include dioctyl phthalate plasticizers. Useful flame retardants include antimony trioxide. The polymer composition can also include aluminum hydroxide.

A typical flexible polyvinyl chloride formulation is listed in Table 1:

TABLE 1

| Oxyvinyl240 F PVC Resin | 100 |
|---|---|
| DOP Plasticizer | 50 |
| Antimony Trioxide | 3 |
| Thermal Stabilizer | 3 |

As an example, PVC containing the borate core smoke suppressant can be made by blending about 30 phr to about 60 phr (parts by weight per hundred parts of resin) of aluminum trihydrate, and about 5 phr to about 15 phr of the borate core smoke suppressant with the blend of the base formula for flexible PVC resin listed in Table 1. The components of the formulation are mixed in a Waring blender mixing vessel. The flexible PVC specimens are fused using a 75-mL Brabender Plasticorder Digisystem equipped with Type 6 roller blades (3:2 ratio). The fusion process parameters include mixing temperature of 165° C. and a mixing time of about 5 min. The fused samples are compression-molded to a ⅛ inch thickness (about 0.32 cm) with a Carver press at 340° F. (about 171° C.). Four plaques are produced per experiment for NBS Smoke Chamber tests.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1

Production of Borate Core Smoke Suppressant 167 grams of zinc borate or calcium borate (core material) and 15.6 grams of zinc oxide (Kadox 911C-Horsehead Zing) is slurried in 765 grams of water. The slurry is heated to 75-80° C. 19.5 grams of Molybdenum Trioxide (Thompson Creek) is added to about 100 grams of hot water. The Molybdenum Trioxide mixture is then added to the slurry using a pipette. The slurry mixture is stirred and allowed to react for about 2 hours. The product is vacuum filtered and dried for about 4 hours in an oven about 140° C. After drying, a lab grinder is used to break up agglomerates.

The following comparative examples demonstrate the results obtained utilizing the borate core smoke suppressant compounds of the invention in PVC. Plasticized PVC plaques (4"×4"⅛") were prepared and tested via the NBS smoke chamber test methods as described below. All test compounds are mixed using a Brabender Plasticarder and test plaques are prepared by compression molding. The smoke generated by combustion of the PVC plaques are determined in the NBS Smoke chamber according to ASTM E662, incorporated herein by reference.

Test Methods

ASTM E662 NBS Smoke Chamber: The release of smoke generated by the combustion of plastic materials can be determined using the National Bureau of Standards (NBS) smoke chamber method, standardized in the U.S. as ASTM E662. This test was originally developed to determine the smoke generating characteristics of plastic materials used in aircraft construction. The NBS smoke chamber measures smoke density accumulated when a specimen of specified form and thickness is exposed to a radiant heat source of 25 kW/m$^2$. Depending on the application, either the maximum smoke density or the smoke density at a set time (usually 4 minutes) can be specified. The test can be run with or without the application of a pilot flame (flaming and smoldering mode, respectively).

Comparative Examples

Figure 2:
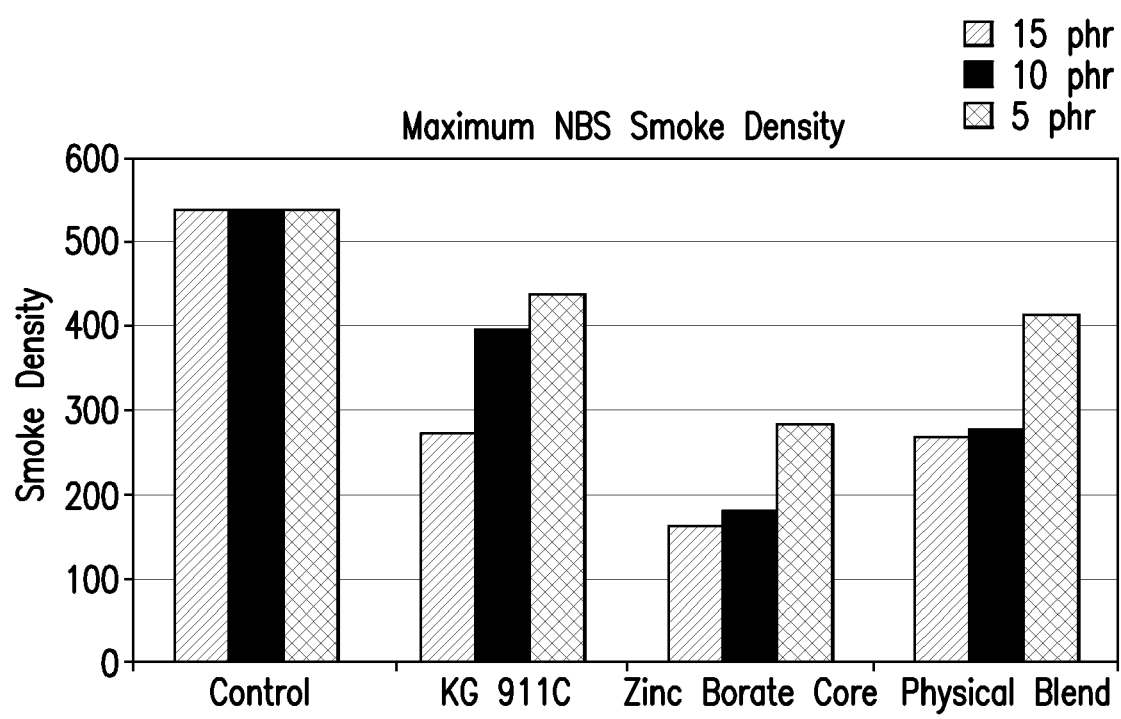
FIG. 2 is a bar plot showing maximum smoke density for Control (no smoke suppressant), KG911C (commercial smoke suppressant), zinc borate core smoke suppressant of the present invention, and a physical blend of zinc borate and zinc molybdate.

Commercial Smoke Suppressant vs. Physical Blend of Zinc Borate with Zinc Molybdate vs. Zinc Borate Core Smoke Suppressant PVC plaques were made by adding to the PVC composition of Table 1 varying amounts of: 1) a commercial smoke suppressant, KG911C from The Sherwin-Williams Company, 2) a physical mixture of zinc borate and zinc molybdate, and 3) the inventive borate core smoke suppressant prepared according to Example 1 using zinc borate. The samples had total smoke suppressant content levels of 5 phr, 10 phr, and 15 phr (parts per hundred PVC resin). The control sample (no smoke suppressant) contains 50 phr aluminum trihydrate (ATH). Samples having 15 phr of smoke suppressant contain 35 phr ATH; samples having 10 phr smoke suppressant contain 40 phr ATH; samples having 5 phr smoke suppressant contain 45 phr ATH. The NBS Smoke results are presented in FIGS. 1 and 2. FIG. 1 shows results from a four minute NBS smoke density test for Control (no smoke suppressant), KG911C (commercial smoke suppressant), zinc borate core smoke suppressant of the present invention, and a physical blend of zinc borate and zinc molybdate. FIG. 2 shows maximum smoke density for Control (no smoke suppressant), KG911C (commercial smoke suppressant), zinc borate core smoke suppressant of the present invention, and a physical blend of zinc borate and zinc molybdate.

These data demonstrate that at all use levels, the inventive zinc borate core smoke suppressant of the present invention exceeds the performance of the commercial samples and the physical blend of zinc borate and zinc molybdate. These results show that precipitating zinc molybdate on a borate core provides synergistic effects over just a physical mixture of zinc molybdate with zinc borate.

Various modifications and variations can be made to the compounds, composites, kits, articles, devices, compositions, and methods described herein. Other aspects of the compounds, composites, kits, articles, devices, compositions, and methods described herein will be apparent from consideration of the specification and practice of the compounds, composites, kits, articles, devices, compositions, and methods disclosed herein. It is intended that the specification and examples be considered as exemplary.

What is claimed is:

1. A smoke suppressant, comprising:
   a. from about 75% to about 95% by weight of a borate core material; and
   b. from about 5% to about 25% by weight of zinc molybdate on the surface of the borate core material.

2. The smoke suppressant of claim 1, wherein the borate core material is zinc borate or calcium borate.

3. A smoke suppressant, comprising:
   a. a borate core material; and
   b. a reaction product of a zinc compound and a molybdate compound on the surface of the borate core material.

4. The smoke suppressant of claim 3, wherein the borate core material comprises zinc borate or calcium borate.

5. The smoke suppressant of claim 3, wherein the zinc compound comprises zinc oxide.

6. The smoke suppressant of claim 3, wherein the molybdate compound comprises ammonium dimolybdate, ammonium octamolybdate, or molybdenum trioxide.

7. The smoke suppressant of claim 1, wherein the borate core comprises zinc borate.

8. The smoke suppressant of claim 1, wherein the borate core comprises calcium borate.

* * * * *